(12) United States Patent
Al-Shyoukh et al.

(10) Patent No.: US 9,509,210 B2
(45) Date of Patent: Nov. 29, 2016

(54) START-UP CIRCUIT AND METHOD FOR AC-DC CONVERTERS

(71) Applicant: TAIWAN SEMICONDUCTOR MANUFACTURING COMPANY, LTD., Hsinchu (TW)

(72) Inventors: Mohammad Al-Shyoukh, Cedar Park, TX (US); Percy Neyra, Austin, TX (US)

(73) Assignee: TAIWAN SEMICONDUCTOR MANUFACTURING COMPANY, LTD. (TW)

( * ) Notice: Subject to any disclaimer, the term of this patent is extended or adjusted under 35 U.S.C. 154(b) by 14 days.

(21) Appl. No.: 13/944,386

(22) Filed: Jul. 17, 2013

(65) Prior Publication Data

US 2015/0023072 A1    Jan. 22, 2015

(51) Int. Cl.
    *H02M 3/335*    (2006.01)
    *H02M 1/36*     (2007.01)
    *H02M 1/42*     (2007.01)
    *H02M 1/00*     (2006.01)

(52) U.S. Cl.
    CPC ............. *H02M 1/36* (2013.01); *H02M 1/4258* (2013.01); *H02M 3/33507* (2013.01); *H02M 2001/0006* (2013.01); *Y02B 70/126* (2013.01)

(58) Field of Classification Search
    CPC ...... H02M 7/217; H02M 7/219; H02M 7/19; H02M 7/162; H02M 3/315; H02M 3/33533
    USPC ....... 363/131, 132, 133, 134, 135, 136, 137, 363/138, 139, 49
    See application file for complete search history.

(56) References Cited

U.S. PATENT DOCUMENTS

| | | | | |
|---|---|---|---|---|
| 5,459,652 A | * | 10/1995 | Faulk | 363/49 |
| 5,745,358 A | * | 4/1998 | Faulk | 363/95 |
| 7,619,397 B2 | | 11/2009 | Al-Shyoukh | |

* cited by examiner

*Primary Examiner* — Harry Behm
*Assistant Examiner* — Peter Novak
(74) *Attorney, Agent, or Firm* — Hauptman Ham, LLP

(57) ABSTRACT

For starting-up a power converter, an AC rectified voltage is generated upon power-up of the power converter. A depletion mode transistor generates a first voltage from the rectified voltage. The first voltage is inputted to a controller of the power converter to provide power for operation of the controller before an output stage of the power converter starts outputting power. A gate biasing voltage is generated from the first voltage and supplied to a gate terminal of the depletion mode transistor to bias the gate terminal of the depletion mode transistor.

20 Claims, 4 Drawing Sheets

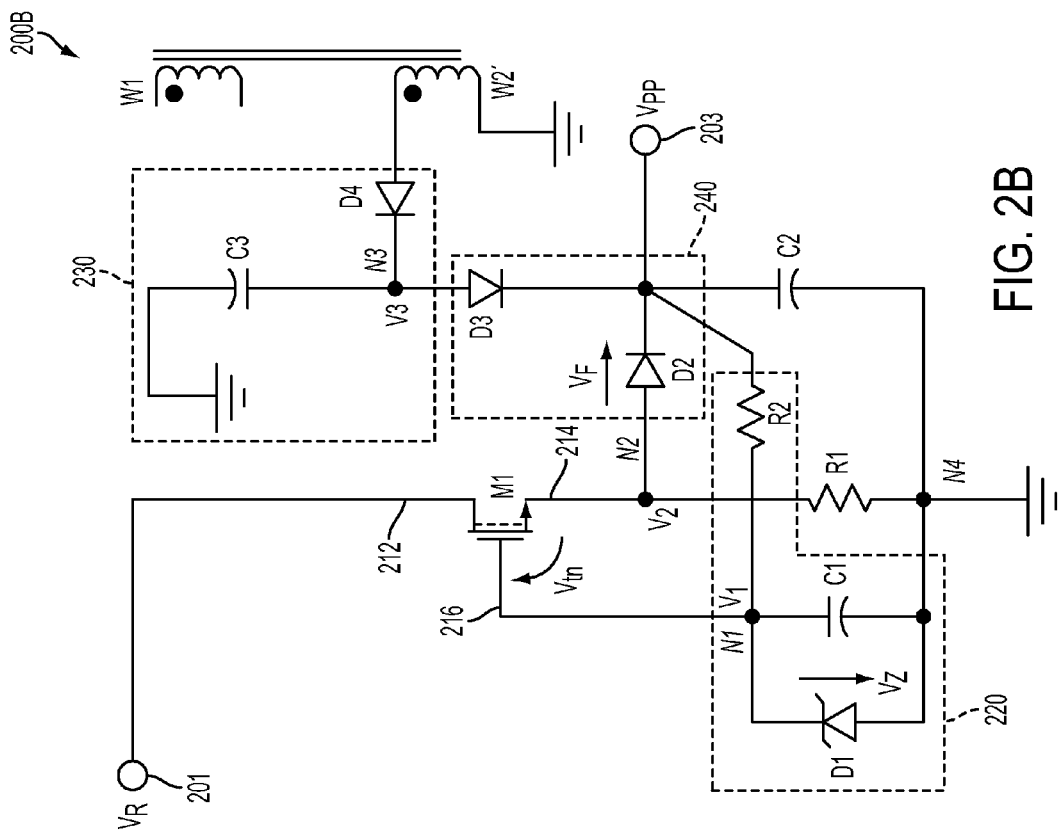
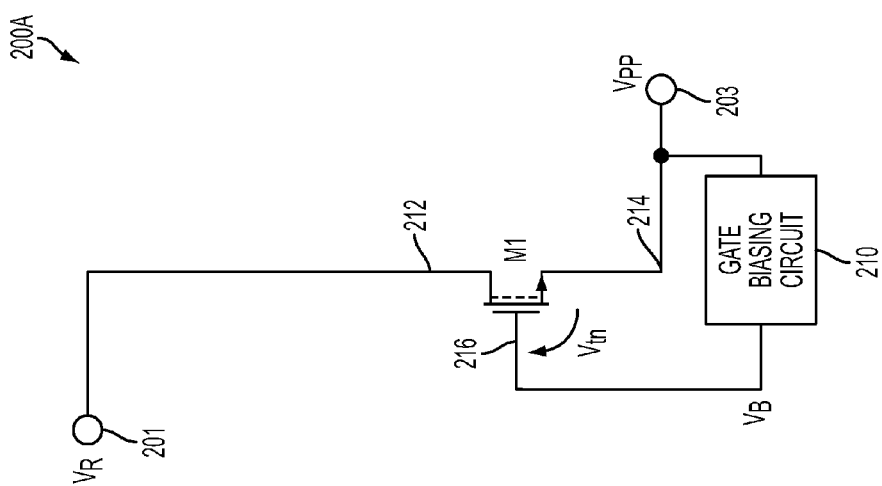
FIG. 2B
FIG. 2A

START-UP CIRCUIT AND METHOD FOR AC-DC CONVERTERS

RELATED APPLICATION(S)

The instant application is related to U.S. patent application Ser. No. 13/598,288, filed Aug. 29, 2012, and titled "START-UP CIRCUIT AND METHOD FOR AC-DC CONVERTERS," the entire content of which is incorporated by reference herein.

The instant application is also related to U.S. patent application Ser. No. 13/672,304, filed Nov. 8, 2012, and titled "START-UP CIRCUIT AND METHOD WITH SOFT-START SCHEME FOR AC-DC CONVERTERS," the entire content of which is incorporated by reference herein.

The instant application is further related to U.S. patent application Ser. No. 13/771,586, filed Feb. 20, 2013, and titled "START-UP CIRCUIT AND METHOD FOR AC-DC CONVERTERS," the entire content of which is incorporated by reference herein.

BACKGROUND

AC-DC power converters are used in many applications, including consumer electronics, LED lighting, and other kinds of electrical or electronic devices. In a typical application, the AC-DC power converter produces a regulated DC output from an AC input which comes from the utility grid. The regulated DC output is either a voltage as in power supply applications, or a current as in emerging LED lighting applications.

BRIEF DESCRIPTION OF THE DRAWINGS

One or more embodiments are illustrated by way of example, and not by limitation, in the figures of the accompanying drawings, wherein elements having the same reference numeral designations represent like elements throughout. The drawings are not to scale, unless otherwise disclosed.

FIG. 2A is a schematic circuit diagram of a start-up circuit in accordance with some embodiments.

FIG. 2B is a schematic circuit diagram of a start-up circuit in accordance with some embodiments.

DETAILED DESCRIPTION

Figure 1:
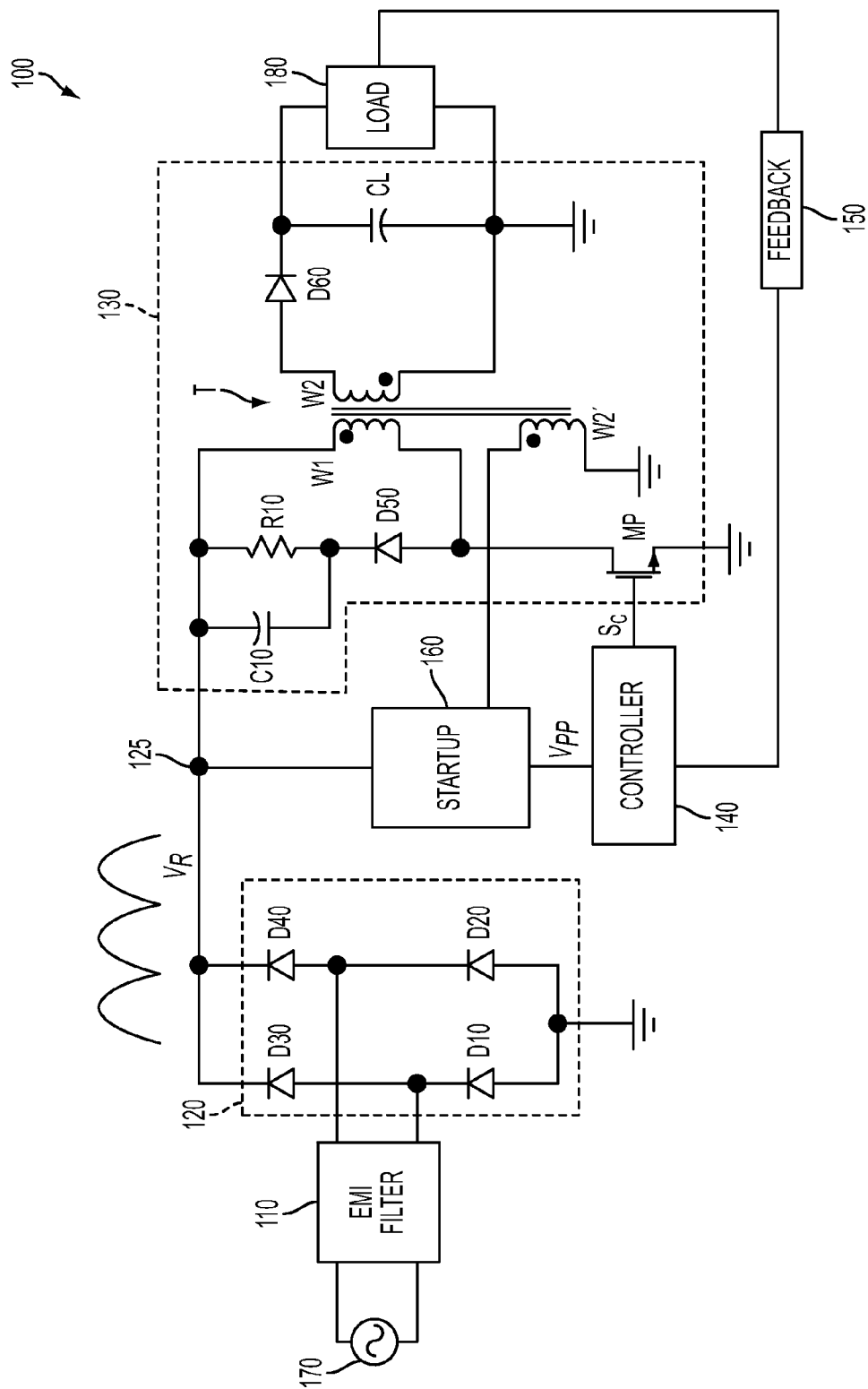
FIG. 1 is a schematic circuit diagram of a power converter in accordance with some embodiments.

It is to be understood that the following disclosure provides many different embodiments or examples, for implementing different features of various embodiments. Specific examples of components and arrangements are described below to simplify the present disclosure. An inventive concept may; however, be embodied in many different forms and should not be construed as being limited to the embodiments set forth herein. It will be apparent; however, that one or more embodiments may be practiced without these specific details Like reference numerals in the drawings denote like elements.

In some embodiments, a start-up circuit for a power converter uses a depletion mode transistor to generate a start-up voltage from a rectified voltage, for powering a controller of the power converter in a start-up phase, i.e., before an output stage of the power converter starts operating and generating power. To boost the start-up voltage to an intended level, a gate terminal of the depletion mode transistor is biased with a gate biasing voltage generated by a gate biasing circuit. The gate biasing circuit is coupled to a power input node of the controller to generate the gate biasing voltage from the voltage supplied to power the controller. In at least one embodiment, the voltage supplied to power the controller is lower than the rectified voltage. As a result, components of the gate biasing circuit are not subject to the high level of the rectified voltage. In at least one embodiment, the gate biasing circuit includes a zener diode for generating the gate biasing voltage. As a result, an accurate and/or stable gate biasing voltage is obtainable. The described technique is suitable for high voltage applications in accordance with one or more embodiments.

FIG. 1 is a schematic circuit diagram of a power converter 100 in accordance with some embodiments. The power converter 100 includes an electromagnetic interference (EMI) filter 110, a rectifying unit 120, an output stage 130, a controller 140, a feedback circuit 150, and a start-up circuit 160. In some embodiments, the power converter 100 is implemented wholly or partly on a single integrated circuit (also referred to as chip), or on a multi-chip structure. In some embodiments, one or more components of the power converter 100 are configured as discrete components and are mounted on a printed circuit board (PCB) having conductive traces that connect the discrete components to the chip or chips containing the remaining components.

The EMI filter 110 is coupled to a power source 170. In one or more embodiments, the power source 170 is an AC power source, such as the utility grid. The EMI filter 110 includes one or more passive and/or active electronic components configured to suppress EMI from the power source 170 from affecting operation of the other components of the power converter 100. In one or more embodiments, the EMI filter 110 is further configured to provide surge protection for the other components of the power converter 100. In one or more embodiments, the EMI filter 110 is omitted from the power converter 100.

The rectifying unit 120 is coupled to the power source 170, either directly or indirectly via the EMI filter 110, to receive power to be converted. The rectifying unit 120 is configured to output a rectified voltage $V_R$ from the power received from the power source 170. In one or more embodiments, the rectifying unit 120 includes diodes D10-D40 connected with each other to define a full-wave rectifier. Other configurations of the rectifying unit 120 are used in further embodiments.

The output stage 130 is coupled to an output 125 of the rectifying unit 120 and configured to convert, under control of the controller 140, the rectified voltage $V_R$ into a DC voltage for a load 180. The output stage 130 includes a transformer T having a primary winding W1 coupled to the output 125 of the rectifying unit 120 to receive the rectified voltage $V_R$, and at least one secondary winding W2 coupled to the load 180. The transformer T further includes an auxiliary secondary winding W2' to provide power for the controller 140.

On the primary winding (W1) side, the output stage 130 further includes a switch MP (also referred to herein as "power switch MP"), a capacitor C10, a resistor R10 and a diode D50. In one or more embodiments, the switch MP includes a power field-effect transistor (FET), such as a double-diffused metal-oxide-semiconductor (DMOS) transistor. In further embodiments, the switch MP includes one or more other suitable devices, such as an insulated-gate bipolar transistor (IGBT), a field effect transistor (FET), etc. The switch MP has a control terminal coupled to the controller 140 to receive a control signal Sc, and first and second terminals coupled to the ground and the primary winding W1. The primary winding W1 has opposite ends coupled to the rectifying unit 120 and the switch MP. The resistor R10 and diode D50 are coupled in series between the switch MP and the output 125 of the rectifying unit 120. The capacitor 10 is coupled in parallel with the resistor R10.

On the secondary winding (W2) side, the output stage 130 further includes a capacitor CL and a diode D60 which are coupled in series between opposite ends of the secondary winding W2 to form a loop. Other configurations of the output stage 130 are used in further embodiments.

The controller 140 generates the control signal Sc for controlling the switch MP to turn ON or OFF. After the switch MP is turned ON by the controller 140, a current flows from the rectifying unit 120, via the primary winding W1 and the switch MP, to the ground. Thus, energy supplied from the rectifying unit 120 is built up and stored in the primary winding W1. The built up energy is proportional to the ON time of the switch MP and the rectified voltage $V_R$. After the switch MP is turned OFF by the controller 140, the energy stored in the primary winding W1 is released into a load 180 via the secondary winding W2 and the diode D60, with the capacitor CL acting as the load capacitor. The diode D50, capacitor C10 and resistor R10 act as primary-side clamps during the energy release from the primary winding W1 to the secondary winding W2. The use of the transformer T for energy transmission shields the load 180 from perturbations or glitches that are potentially present on the power source 170. In at least one embodiment, a frequency at which the controller 140 turns ON/OFF the switch MP is higher than a frequency of the power source 170. For example, the controller 140 turns ON/OFF the switch MP at about 200 kHz given the power source frequency of about 50 Hz.

The controller 140 further monitors the outputted power, voltage and/or current (hereinafter commonly referred to as "output") of the output stage 130 and controls the ON/OFF switching of the switch MP to maintain the output of the output stage 130 at a desired level. The output of the output stage 130 is detected by the feedback circuit 150 which provides an isolated, or non-isolated, feedback signal that is indicative of the detected output. The feedback signal also allows the controller 140 to detect short circuits or other faults or malfunctions on the load side. In at least one embodiment, the feedback signal is compared with a reference voltage, and the difference (also referred to as "error signal") is amplified by a gain stage of the controller 140 to output an amplified error signal. The amplified error signal is used by the controller 140 to control the ON time and, by extension, the effective switching frequency of the switch MP, via the control signal Sc, to thereby control the output of the output stage 130. In some embodiments, the controller 140 further includes circuitry to monitor operation of one or more other components of the power converter 100. For example, the controller 140 in at least one embodiment includes circuitry for monitoring the rectified voltage $V_R$. In at least one embodiment, the monitoring circuitry is provided for such functionality as power sequencing and controller enabling, while ensuring that the controller 140 is in a proper state vis-a-vis the behavior of the rectified voltage $V_R$. In at least one embodiment, the monitoring circuitry becomes fully functional and produces a valid signal from the earliest or smallest possible level of the rectified voltage $V_R$.

The start-up circuit 160 is coupled to the output 125 of the rectifying unit 120, the controller 140, and the auxiliary secondary winding W2' of the transformer T. Upon power-up of the power converter 100, the start-up circuit 160 receives the rectified voltage $V_R$ from the rectifying unit 120, and generates a voltage $V_{PP}$ based on the rectified voltage $V_R$. The voltage $V_{PP}$ is outputted, as a start-up voltage, to the controller 140 to provide power for the controller 140 to start the ON/OFF switching of the switch MP. As the switch MP starts switching, the output stage 130 starts outputting power to the load 180 via the secondary winding W2. The power outputted by the output stage 130 is also supplied via the auxiliary secondary winding W2' to the start-up circuit 160. After the power supplied by the output stage 130 via the auxiliary secondary winding W2' reaches a predetermined level, the start-up circuit 160 outputs the voltage $V_{PP}$, based on the power supplied by the output stage 130 for powering further operation of the controller 140. In this aspect, the start-up circuit 160 is configured not only to provide temporary power for the controller 140, but also to perform power management for the controller 140.

FIG. 2A is a schematic circuit diagram of a start-up circuit 200A in accordance with some embodiments. The start-up circuit 200A, in one or more embodiments, corresponds to the start-up circuit 160 in the power converter 100. The start-up circuit 200A includes an input node 201, an output node 203, a transistor M1 and a gate biasing circuit 210. The input node 201 is coupled to the output 125 of the rectifying unit 120 to receive the rectified voltage $V_R$ from the rectifying unit 120. The output node 203 defines a power input node at which the controller 140 receives power for operation thereof.

The transistor M1 has a first terminal 212 coupled to the input node 201, a second terminal 214 coupled to the output node 203, and a gate terminal 216. For example, the first terminal 212 is a drain, and the second terminal 214 is a source of the transistor M1. The transistor M1 is a transistor configured to operate in the depletion mode, and is also referred to herein as the depletion mode transistor M1. In one or more embodiments, the depletion mode transistor M1 is an N-channel depletion FET (or an n-type depletion FET) that has a negative threshold voltage $V_{tn}$, unlike standard enhancement mode n-type FETs which have a positive threshold voltage. In at least one embodiment, the depletion mode transistor M1 has a universal power-grid-compatible drain-source voltage rating of about 400 to about 800 V.

The transistor M1 is configured to generate the voltage $V_{PP}$ from the rectified voltage $V_R$ received at the first terminal 212, and to output the voltage $V_{PP}$ from the second terminal 214 and via the output node 203 to the controller 140 for powering the controller 140 in the start-up phase, i.e., before the output stage 130 starts outputting power. When the gate terminal 216 of the transistor M1 is not biased, the voltage $V_{PP}$ is about equal to the absolute value of the threshold voltage $|V_{tn}|$. In some applications, the absolute value of the threshold voltage $|V_{tn}|$ is lower than a predetermined voltage level for powering the controller 140 in the start-up phase. To boost the voltage $V_{PP}$ to the predetermined voltage level, the gate terminal 216 of the transistor M1 is biased with a gate biasing voltage $V_B$ generated by the gate biasing circuit 210. With the gate terminal 216 being biased by the gate biasing voltage $V_B$, the voltage $V_{PP}$ outputted at the second terminal 214 is increased to $|V_{tn}|+V_B$ which is sufficient for powering the controller 140 in the start-up phase.

The gate biasing circuit 210 is coupled to the output node 203 to receive the voltage $V_{PP}$, and is configured to generate the gate biasing voltage $V_B$ from the voltage $V_{PP}$. In some embodiments, the voltage $V_{PP}$ is significantly lower than the rectified voltage $V_R$. For example, in at least one particular embodiment, the peak level of the rectified voltage $V_R$ is about 240, V, whereas the voltage level of the voltage $V_{PP}$ in the start-up phase is about 12-15 V, i.e., 15-20 times lower than the peak level of the rectified voltage $V_R$. As a result, components of the gate biasing circuit 210 are not subject to the high level of the rectified voltage $V_R$, and are cheaper and/or simpler to manufacture than when the gate biasing circuit 210 receives the rectified voltage $V_R$ for generating the gate biasing voltage $V_B$.

FIG. 2B is a schematic circuit diagram of a start-up circuit 200B in accordance with some embodiments. The start-up circuit 200B, in one or more embodiments, corresponds to the start-up circuit 160 in the power converter 100. The start-up circuit 200B includes the input node 201, the output node 203, the transistor M1, a gate biasing circuit 220, a power section 230 and a selector 240. In some embodiments, the gate biasing circuit 220 corresponds to the gate biasing circuit 210 in the start-up circuit 200A.

The gate biasing circuit 220 is configured to bias, via a node N1, the gate terminal 216 of the transistor M1. The transistor M1 is configured to generate, at a node N2, a first voltage $V_2$ from the rectified voltage $V_R$ and to output the first voltage $V_2$ to the controller 140, via the output node 203, to power the controller 140 before the output stage 130 starts outputting power. The power section 230 is coupled to the output stage 130, via the auxiliary secondary winding W2', and configured to generate, at a node N3, a second voltage $V_3$ from power supplied by the output stage 130 after the output stage 130 starts operating. The selector 240 is configured to select and output the higher of the first and second voltages $V_2$ and $V_3$, as the voltage $V_{PP}$ and via the output node 203, to the controller 140.

The transistor M1 has the first terminal 212 coupled to the input node 201, the second terminal 214 coupled to the node N2, and the gate terminal 216 coupled to the node N1. For example, the first terminal 212 is a drain, and the second terminal 214 is a source of the transistor M1. A resistor R1 is coupled between the second terminal 214 of the transistor M1 and a reference node N4 having a reference voltage, such as the ground voltage. A capacitor C2 is coupled between the output node 203 and the reference node N4.

The gate biasing circuit 220 includes a diode D1, a capacitor C1 and a resistor R2. The diode D1 is a zener diode that has a cathode coupled to the gate terminal 216 of the transistor M1 via the node N1, and an anode coupled to the reference node N4. The diode D1, also referred to herein as the zener diode D1, has a reverse zener voltage $V_Z$. The capacitor C1 is coupled in parallel with the zener diode D1. The resistor R2 is coupled between the node N1 and the output node 203.

The selector 240 includes a diode D2 and a diode D3. The diode D2 has a cathode coupled to the output node 203, and an anode coupled to the node N2 where the first voltage $V_2$ is outputted by the transistor M1. The diode D3 has a cathode coupled to the output node 203, and an anode coupled to the power section 230 via the node N3. Other configurations for the selector 240 are used in further embodiments. For example, in at least one embodiment, one or both of the diode D2 and diode D3 is/are implemented as a plurality of diodes coupled in series.

The power section 230 includes a capacitor C3 and a diode D4. The diode D4 has a cathode coupled to an anode of the diode D3 via the node N3, and an anode configured to receive power from the output stage 130. For example, the anode of the diode D4 is coupled to an end of the auxiliary secondary winding W2', the other end of the auxiliary secondary winding W2' being grounded. The capacitor C3 is coupled between the cathode of the diode D4 and the ground. Other configurations of the power section 230 are used in further embodiments.

Figure 3:
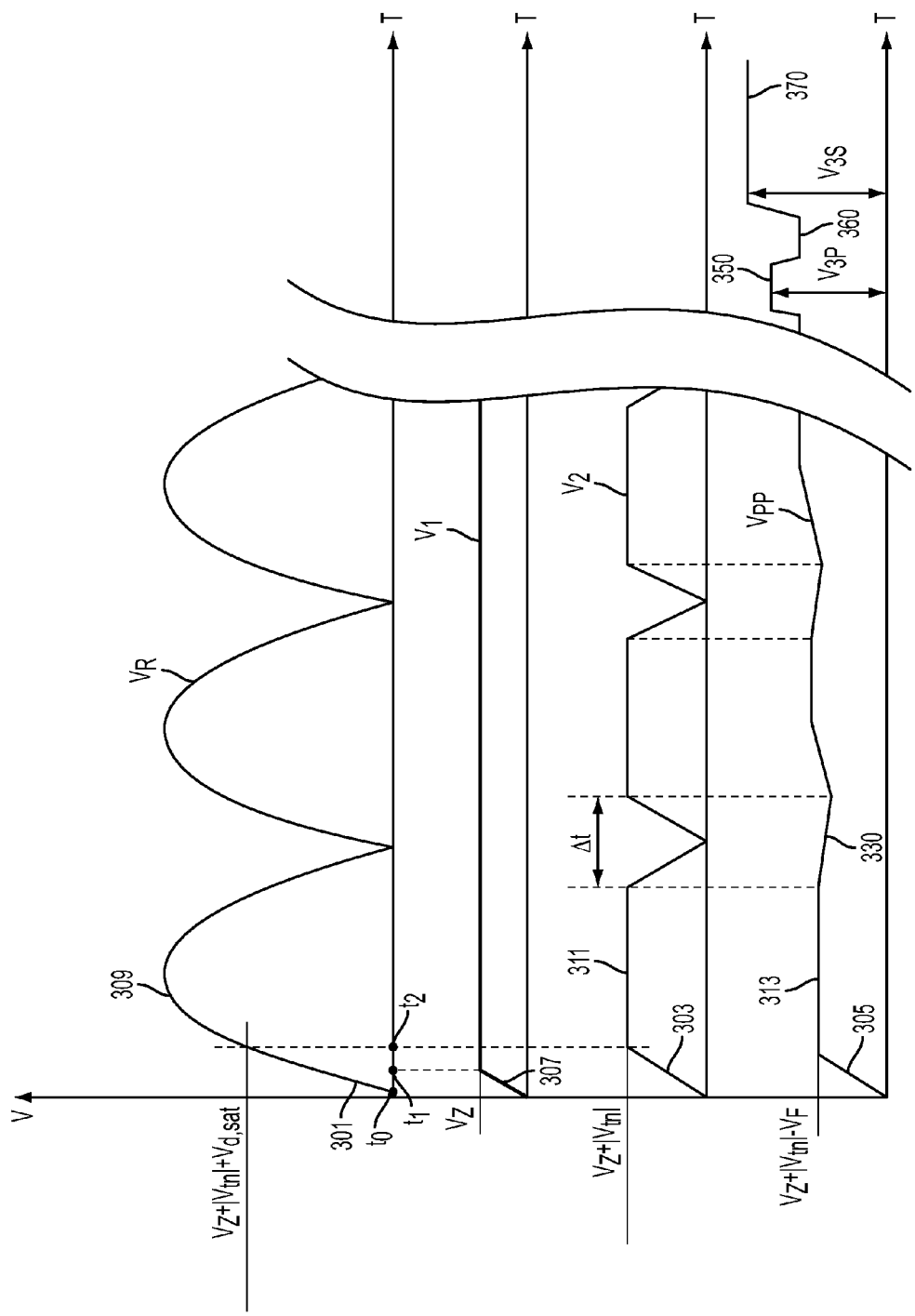
FIG. 3 is a timing diagram of a start-up circuit in accordance with some embodiments.

The operation of the start-up circuit 200B will now be described with reference to both FIG. 2B and FIG. 3. FIG. 3 is a timing diagram of the operation of the start-up circuit 200B in accordance with some embodiments. It should be noted that FIG. 3 is not drawn to scale. Further, for the sake of simplicity, it is assumed in the following description that the diodes D2-D4 have the same forward voltage $V_F$. However, diodes having different forward voltages are usable as one or more of diodes D2-D4 in various embodiments.

Upon power-up of the power converter 100, the rectifying unit 120 starts outputting the rectified voltage $V_R$, as indicated at time $t_0$ in FIG. 3. The rectified voltage $V_R$ starts rising at a rising edge 301. The rectified voltage $V_R$ is supplied via the input node 201 to the first terminal 212, e.g., the drain, of the transistor M1. The transistor M1 functions as a source follower that delivers power from the input node 201 to the node N2. Specifically, as indicated in FIG. 3, the first voltage $V_2$ at the second terminal 214, e.g., the source, of the transistor M1 follows the rectified voltage $V_R$ at the drain of the transistor M1, and rises, at a rising edge 303, together with the rising edge 301 of the rectified voltage $V_R$. When the first voltage $V_2$ exceeds the forward voltage $V_F$ of the diode D2, the voltage $V_{PP}$ at the output node 203 starts rising, at a rising edge 305, together with the rising edge 301 of the rectified voltage $V_R$ and the rising edge 303 of the first voltage $V_2$. Because the node N1 is connected to the output node 203 via the resistor R2, the voltage $V_1$ at the node N1 (and also at the gate terminal 216 of the transistor M1) starts rising, at a rising edge 307, together with the rising edge 305 of the voltage $V_{PP}$. As the voltage $V_1$ at the node N1 reaches the reverse zener voltage $V_Z$ of the zener diode D1 as indicated at time $t_1$ in FIG. 3, the voltage V1 will stay at that level even though the rectified voltage $V_R$ continues to rise. The gate terminal 216 of the transistor M1 is biased by the voltage $V_Z$ at the node N1. The voltage $V_Z$ corresponds to the gate biasing voltage $V_B$ discussed with respect to the start-up circuit 200A in FIG. 2A.

When the rectified voltage $V_R$ reaches and exceeds the sum of $V_Z+|V_{tn}|+V_{d,sat}$ as indicated at time $t_2$ and section 309 in FIG. 3, respectively, the first voltage $V_2$ is equal to $V_Z+|V_{tn}|$ as indicated at section 311 in FIG. 3. The voltage $V_{d,sat}$ is a minimum drain-source overdrive voltage at which the transistor M1 enters the saturation region. When the first voltage $V_2$ is equal to $V_Z+|V_{tn}|$, the voltage $V_{PP}$ is equal to $V_Z+|V_{tn}|-V_F$ as indicated at section 313 in FIG. 3.

When the rectified voltage $V_R$ is at or below $V_Z+|V_{tn}|+V_{d,sat}$, as indicated at $\Delta t$ in FIG. 3, the first voltage $V_2$ tracks the rectified voltage $V_R$ as the transistor M1 leaves the saturation region and enters into the linear region. The period $\Delta t$ during which the first voltage $V_2$ is below the level $V_Z+|V_{tn}|$ is small compared to the period during which the first voltage $V_2$ is at the level $V_Z+|V_{tn}|$. For example, in at least one particular embodiment, the peak level of the rectified voltage $V_R$ is about 240 V, $V_Z$ is about 10 V, $|V_{tn}|$ is about 3~4 V, $V_F$ is about 0.7 V, and $V_{d,sat}$ is about 0.2 V. In the particular embodiment, for most of the cycle, $V_R$ is greater than $V_Z+|V_{tn}|+V_{d,sat}$ i.e., greater than about 13.2~14.2 V. As a result, the first voltage $V_2$, for most of the cycle, is constant at the level of $V_Z+|V_{tn}|$ of about 13~14 V. In some embodiments, the first voltage $V_2$ is in a range of 12~15 V. The short periods Δt during which the first voltage $V_2$ falls below the level of $V_Z+|V_{tn}|$ are insignificant compared to the periods during which the first voltage $V_2$ is at the level of $V_Z+|V_{tn}|$. As a result, a periodically intermittent start-up power rail of relatively good quality is provided as the voltage $V_{PP}=V_Z+|V_{tn}|-V_F$ at the output node 203, which is also the power input node of the controller 140, in the start-up phase before the output stage 130 starts outputting power.

In at least one embodiment, the resistor R1 is selected to set a minimum current through the source follower (i.e., the transistor M1) to maintain a predetermined bandwidth for the source follower and improve the transient recovery of the source follower. The capacitor C1 is selected to achieve a good transient response from the source follower in the event of a sudden and/or large draw of charge through the node N2. For example, the first capacitor C1 is selected to have a sufficient capacitance for holding charge and maintaining the voltage $V_1$ at about $V_Z$ in the event of a sudden drop of the voltage $V_{PP}$ to a level below voltage $V_Z$.

Upon start-up of the power converter 100, the output stage 130 does not yet start outputting power. As described above and indicated in FIG. 3, during the rising edge 305, the voltage $V_{PP}$ starts rising with the first voltage $V_2$ and charges the capacitor C2. During the subsequent period corresponding to the section 313, the voltage $V_{PP}$, reaches the level of $V_Z+|V_{tn}|-V_F$. During a subsequent period 330 corresponding to the period Δt when the first voltage $V_2$ falls below the constant level of $V_Z+|V_{tn}|$, the voltage $V_{PP}$ drops slightly. The capacitor C2 is selected to have a sufficient capacitance for holding charge and maintaining the voltage $V_{PP}$ at about the same level of $V_Z+|V_{tn}|-V_F$ during the period 330. In at least one embodiment, the capacitor C2 is sufficiently large to sustain a ground current of the controller 140. In various embodiments, the short duration and the slight voltage drop of the period 330 are insignificant, and the voltage $V_{PP}$ is considered as a power rail of relatively high quality for powering the controller 140. The diode D2 provides a reverse-blocking path between the output node 203 and the node N2 to prevent the capacitor C2 from discharging through the resistor R1 after the first voltage $V_2$ drops below the voltage $V_{PP}$ e.g., during the period 330.

In at least one embodiment, the voltage $V_{PP}$ reaches the level of $V_Z+|V_{tn}|-V_F$ within the first cycle of the rectified voltage $V_R$. In at least one embodiment, during the first rising edge 301 of the rectified voltage $V_R$, the voltage $V_{PP}$ reaches a level sufficient to power at least one circuit of the controller 140. For example, during the first rising edge 301 of the rectified voltage $V_R$, the voltage $V_{PP}$ reaches a level sufficient to power the circuitry that monitors the rectified voltage $V_R$.

After the controller 140 starts the ON/OFF switching of the switch MP, the output stage 130 starts outputting power to the power section 230 via the auxiliary secondary winding W2'. The energy released from the primary winding W1 to the auxiliary secondary winding W2' starts building up charge in the capacitor C3 via the diode D4. As a result, a second voltage $V_3$ at the node N3 starts to rise. After a sufficient number of cycles has passed, the second voltage $V_3$ reaches a level that is higher than the maximum level of the first voltage $V_2$ at the output of the source follower. In some embodiments, this arrangement is achieved by selecting a proper winding ratio between the primary winding W1 and the auxiliary secondary winding W2'. The capacitor C3 is selected to maintain the second voltage $V_3$ at a constant, steady-state level, thereby providing a steady-state power rail for the controller 140 at the node N3 after the start-up phase. The diode D4 provides a reverse-blocking function to prevent the energy or charge stored in the capacitor C3 from discharging back to the auxiliary secondary winding W2' when the auxiliary secondary winding W2' is not delivering energy to the capacitor C3.

The handoff mechanism between the start-up power rail, i.e., the first voltage $V_2$ at the second node N2, and the steady-state power rail, i.e., the second voltage $V_3$ at the node N3, is achieved via the selector 240 which is a maximum selector that selects and outputs the higher of the first voltage $V_2$ and the second voltage $V_3$ to the output node 203 as the voltage $V_{PP}$. In other words, $V_{PP}=\max(V_2, V_3)-V_F$.

As the second voltage $V_3$ rises and exceeds the first voltage $V_2$, the diode D3 of the selector 240 is forward-biased and delivers power from the power section 230 to the output node 203, whereas the diode D2 of the selector 240 is reverse-biased and stops conducting power from the transistor M1 to the output node 203. As a result, the voltage $V_{PP}$ is equal to the second voltage $V_3$. In some situations as indicated in FIG. 3, the second voltage $V_3$ reaches an intermediate level $V_{3p}$ that temporarily exceeds the first voltage $V_2$ but not yet reaches the higher steady-state level $V_{3s}$. In such situations, the voltage $V_{PP}$ becomes temporarily defined, as indicated at section 350 in FIG. 3, by the intermediate level $V_{3p}$ of the second voltage $V_3$ before reverting back, as indicated at section 360 in FIG. 3, to the level defined by the first voltage $V_2$. When the second voltage $V_3$ reaches the steady-state level $V_{3s}$, the voltage $V_{PP}$ is defined by that level, as indicated at section 370 in FIG. 3, and remains at the steady-state level $V_{3s}$ during subsequent operations of the power converter 100. In at least one particular embodiment, the steady-state level of the second voltage $V_3$ is about 15~20 V.

Once the second voltage $V_3$ has reached the steady-state level that exceeds the maximum level of the first voltage $V_2$, the power section 230 takes over the delivery of the voltage $V_{PP}$ to the output node 203, and acts as the power supply for the controller 140. The steady-state level of the second voltage $V_3$ provides a steady-state power rail that is more efficient than the start-up power rail provided by the first voltage $V_2$. After the power section 230 takes over the delivery of the voltage $V_{PP}$ to the output node 203, the power dissipation through the transistor M1 is defined by the resistor R1. The current through the resistor R1 is approximately given by $(V_Z+|V_{tn}|)/R1$ and is kept small, in at least one embodiment, to minimize power consumption of the start-up circuit 200B.

In one or more embodiments, the use of the depletion mode transistor M1 provides good headroom performance and/or fast charge buildup on the voltage $V_{PP}$ during the start-up phase before the output stage 130 starts outputting power, as described in U.S. patent application Ser. No. 13/598,288. In one or more embodiments, the use of the selector 240 provides a smooth handoff from the start-up phase, when the controller is powered by the first voltage $V_2$, to the steady-state phase, when the controller is powered by the second voltage $V_3$, as described in U.S. patent application Ser. No. 13/598,288. In one or more embodiments, the start-up circuit 200A or 200B functions as the corresponding voltage pre-regulator disclosed in U.S. patent application Ser. No. 13/672,304.

As described herein, the gate biasing voltage at the gate terminal 216 of the transistor M1 is generated from the voltage $V_{PP}$ supplied to the controller 140. During the start-up phase when the output stage 130 does not yet start outputting power, the voltage $V_{PP}$ is defined by the first voltage $V_2$ outputted by the transistor M1, and the gate biasing voltage is generated from the first voltage $V_2$. When the output stage 130 starts outputting power, the voltage $V_{PP}$ is defined by the higher of the first voltage $V_2$ and second voltage $V_3$. As a result, the gate biasing voltage is generated from the first higher of the first voltage $V_2$ and second voltage $V_3$. When the power converter 100 reaches the steady-state phase, the voltage $V_{PP}$ is defined by the second voltage $V_3$ outputted by the power section 230, and the gate biasing voltage is generated from the second voltage $V_3$. In some embodiments, despite fluctuations and/or handoff of the voltage $V_{PP}$, the gate biasing voltage is maintained steady by using the zener diode D1.

In at least one embodiment, the voltage $V_{PP}$ is configured to be higher than the voltage $V_Z$ at the node N1 to maintain the constant gate biasing voltage $V_Z$ at the node N1. The relationship $V_{PP} > V_Z$ is satisfied when $V_Z + |V_{tn}| - V_F > V_Z$, i.e., when the absolute value of the threshold voltage $|V_{tn}|$ of the transistor M1 is greater than the forward voltage $V_F$ of the zener diode D1. In at least one embodiment, the absolute value of the threshold voltage $|V_{tn}|$ of the transistor M1 is at least three times greater than the forward voltage $V_F$ of the zener diode D1, i.e., $|V_{tn}| > 3 \times V_F$. In at least one embodiment, the absolute value of the threshold voltage $|V_{tn}|$ of the transistor M1, the forward voltage $V_F$ of the zener diode D1 and/or the resistance value of the resistor R2 are selected to minimize a current $(|V_{tn}| - V_F)/R2$ flowing through the resistor R2. For example, the current flowing through the resistor R2 is a few microamperes (μA) during the steady-state phase. In at least one embodiment, during the start-up phase when the voltage $V_{PP}$ is being built up, no current is flowing through the zener diode D1 before voltage $V_{PP}$ reaches at least the voltage $V_Z$.

The circuitry including the zener diode D1, the capacitor C1 and the resistor R2 forms the gate biasing circuit 220 that provides a constant voltage $V_Z$ for biasing the gate terminal 216 of the depletion mode transistor M1 from the time t1 through subsequent operations of the power converter 100. The gate biasing circuit 220 is coupled to the output node 203 to receive the voltage $V_{PP}$ provided to the controller 140. As a result, the components of the gate biasing circuit 220, especially the resistor R2, are not subject to the high level of the rectified voltage $V_R$ and are implementable by low-voltage components. Because high voltage components, such as a high voltage resistor, are not included in the gate biasing circuit 220 in accordance with some embodiments, the manufacturing process of the gate biasing circuit 220 is cheaper and/or simpler than when a high-voltage resistor is used, e.g., for coupling a gate biasing circuit to receive the rectified voltage $V_R$. In addition, by using the zener diode D1 to generate the gate biasing voltage $V_Z$, an accurate and/or stable gate biasing voltage is obtainable. Such an accurate and/or stable gate biasing voltage improves the quality (e.g., stability) of the voltage $V_{PP}$ supplied to the controller 140. Other configurations of the gate biasing circuit 220 for providing a constant gate biasing voltage at the gate terminal 216 of the depletion mode transistor M1 are used in further embodiments.

Figure 4:
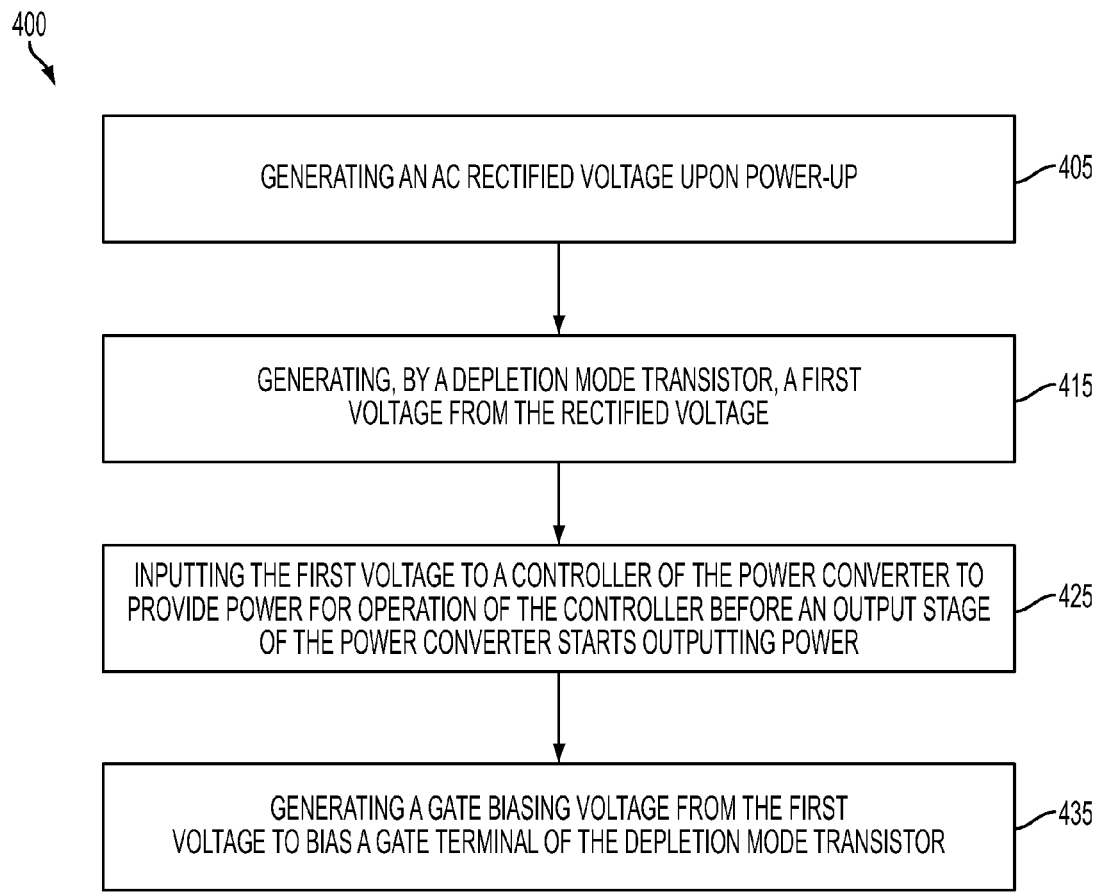
FIG. 4 is a flow chart of a method of starting-up a power converter in accordance with some embodiments.

FIG. 4 is a flow chart of a method of starting-up a power converter in accordance with some embodiments. In one or more embodiments, the method is performed by a start-up circuit, such as the start-up circuit 200B described herein, to start-up a power converter, such as the power converter 100 described herein.

At operation 405, an AC rectified voltage is generated upon power-up of the power converter. For example, the rectified voltage $V_R$ is generated upon power-up of the power converter 100, as described herein.

At operation 415, a first voltage is generated from the rectified voltage by a depletion mode transistor. For example, the first voltage $V_2$ is generated from the rectified voltage $V_R$ by the depletion mode transistor M1, as described herein.

At operation 425, a controller of the power converter is powered by the first voltage, before an output stage of the power converter starts outputting power. For example, the controller 140 is powered by the first voltage $V_2$ before the output stage 130 starts outputting power, as described herein.

At operation 435, a gate biasing voltage is generated from the first voltage to bias a gate terminal of the depletion mode transistor. For example, the gate biasing voltage $V_Z$ is generated from the first voltage $V_2$, which is supplied via the output node 203 to the gate biasing circuit 220, to bias the gate terminal 216 of the depletion mode transistor M1, as described herein.

The above method(s) include(s) example operations, which are not necessarily required to be performed in the order shown and/or described. Operations may be added, replaced, changed order, and/or eliminated as appropriate, in accordance with the spirit and scope of embodiments of the disclosure. Embodiments that combine different features and/or different embodiments are within the scope of the disclosure and will be apparent to those of ordinary skill in the art after reviewing this disclosure.

According to some embodiments, an AC-DC power converter comprises rectifying unit, an output stage, a controller and a start-up circuit. The rectifying unit is configured to rectify an AC voltage to a rectified voltage. The output stage is coupled to the rectifying unit and configured to convert the rectified voltage into a DC voltage for a load. The controller is coupled to the output stage and configured to control the output stage. The controller has a power input node. The start-up circuit comprises a depletion mode transistor and a gate biasing circuit. The depletion mode transistor is configured to generate a first voltage from the rectified voltage and to output the first voltage to the power input node of the controller to provide power for operation of the controller before the output stage starts outputting power. The depletion mode transistor has a first terminal coupled to the rectifying unit to receive the rectified voltage, a second terminal coupled to the power input node and configured to output the first voltage, and a gate terminal. The gate biasing circuit is coupled to the gate terminal and the power input node. The gate biasing circuit is configured to supply a gate biasing voltage to the gate terminal based on the power at the power input node.

According to some embodiments, a start-up circuit for a power converter comprises an input node, an output node, a reference node, a depletion mode field-effect transistor (FET), a first diode and a first resistor. The FET has a first terminal coupled to the input node, a second terminal coupled to the output node, and a gate terminal. The first diode has a cathode coupled to the gate terminal of the FET and an anode coupled to the reference node. The first diode is a zener diode. The first resistor is coupled between the output node and the gate terminal.

According to some embodiments, in a method of starting-up a power converter, an AC rectified voltage is generated upon power-up of the power converter. A depletion mode transistor generates a first voltage from the rectified voltage. The first voltage is inputted to a controller of the power converter to provide power for operation of the controller before an output stage of the power converter starts outputting power. A gate biasing voltage is generated from the first voltage and supplied to a gate terminal of the depletion mode transistor to bias the gate terminal of the depletion mode transistor.

It will be readily seen by one of ordinary skill in the art that one or more of the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. An AC-DC power converter, comprising:
    a rectifying unit configured to rectify an AC voltage to a rectified voltage;
    an output stage coupled to the rectifying unit and configured to convert the rectified voltage into a DC voltage for a load;
    a controller coupled to the output stage and configured to control the output stage, the controller having a power input node; and
    a start-up circuit comprising
        a depletion mode transistor configured to generate a first voltage from the rectified voltage and to output the first voltage to the power input node of the controller to continuously provide power for operation of the controller before and after the output stage starts outputting power, the depletion mode transistor having
            a first terminal coupled to the rectifying unit to receive the rectified voltage,
            a second terminal configured to output the first voltage, and
            a gate terminal;
        a gate biasing circuit coupled to the gate terminal and the power input node, the gate biasing circuit configured to supply a gate biasing voltage to the gate terminal based on the power at the power input node; and
        a first diode comprising a cathode and an anode, the cathode being coupled to the power input node and the anode being coupled to the second terminal of the depletion mode transistor.

2. The AC-DC power converter of claim 1, wherein the gate biasing voltage is a substantially constant voltage after the rectified voltage reaches a predetermined voltage level after power-up of the AC-DC power converter.

3. The AC-DC power converter of claim 2, wherein the gate biasing circuit comprises a zener diode configured to generate the gate biasing voltage.

4. The AC-DC power converter of claim 1, wherein the gate biasing circuit comprises a resistor having opposite first and second ends, the first end coupled to the gate terminal, the second end coupled to the power input node.

5. The AC-DC power converter of claim 4, wherein the gate biasing circuit further comprises a zener diode, the zener diode coupled between the gate terminal and a reference node having a reference voltage.

6. The AC-DC power converter of claim 5, wherein the gate biasing circuit further comprises a capacitor coupled in parallel with the zener diode.

7. The AC-DC power converter of claim 1, wherein an absolute value of a threshold voltage of the depletion mode transistor is greater than a forward voltage of the first diode.

8. The AC-DC power converter of claim 1, wherein an absolute value of a threshold voltage of the depletion mode transistor is at least three times greater than a forward voltage of the first diode.

9. The AC-DC power converter of claim 1, wherein the start-up circuit further comprises:
    a power section coupled to the output stage and configured to generate a second voltage from power supplied by the output stage after the output stage starts operating; and
    a selector configured to select and output the higher of the first and second voltages to the power input node of the controller.

10. The AC-DC power converter of claim 9, wherein the power section comprises a second diode having a cathode and an anode, the cathode being coupled to an anode of a third diode, and the anode being configured to receive power.

11. A start-up circuit for a power converter, the start-up circuit comprising:
    an input node, an output node coupled to a power input terminal of a controller, and a reference node;
    a depletion mode field-effect transistor (FET) having a first terminal coupled to the input node, a second terminal configured to output a first voltage, and a gate terminal;
    a first diode having a cathode coupled to the gate terminal of the FET and an anode coupled to the reference node, wherein the first diode is a zener diode;
    a first resistor coupled between the output node and the cathode of the first diode; and
    a second diode having a cathode coupled to the output node and an anode coupled to the second terminal.

12. The start-up circuit of claim 11, wherein an absolute value of a threshold voltage of the FET is greater than a forward voltage of the second diode.

13. The start-up circuit of claim 11, further comprising:
    a first capacitor coupled in parallel with the first diode; and
    a second resistor coupled between the second terminal and the reference node.

14. The start-up circuit of claim 13, further comprising:
    a third diode having a cathode coupled to the output node; and
    a fourth diode having a cathode coupled to an anode of the third diode, and an anode configured to receive power.

15. The start-up circuit of claim 14, further comprising:
    a second capacitor coupled between the output node and the reference node; and
    a third capacitor coupled between the anode of the third diode and the reference node.

16. The start-up circuit of claim 15, wherein the fourth diode and the third capacitor are configured to generate a second voltage from power supplied by an output stage after the output stage starts operating.

17. The start-up circuit of claim 11, wherein the FET is an N-channel depletion mode FET.

18. A method of starting-up a power converter, the method comprising:
    generating an AC rectified voltage upon power-up of the power converter;

generating, by a depletion mode transistor, a first voltage from the AC rectified voltage;

inputting the first voltage to a power input node of a controller of the power converter through a diode to continuously provide power for operation of the controller before and after an output stage of the power converter starts outputting power, wherein a cathode of the diode is coupled to the power input node of the controller and an anode of the diode is coupled to the depletion mode transistor, the anode of the diode being configured to receive the first voltage; and generating a gate biasing voltage from the first voltage and supplying the gate biasing voltage to a gate terminal of the depletion mode transistor.

19. The method of claim 18, further comprising:

controlling, by the controller receiving power from the first voltage, the output stage to output power;

generating a second voltage from the power supplied by the output stage;

selecting and outputting the higher of the first and second voltages to the controller; and generating the gate biasing voltage from the higher of the first and second voltages.

20. The method of claim 18, further comprising:

conducting a current flowing from the power input node to the gate terminal of the depletion mode transistor; and wherein the controller receives the power for operation of the controller at the power input node.

* * * * *